United States Patent
Zetterlund et al.

[15] 3,675,587
[45] July 11, 1972

[54] TOW LINE TRUCK AND BUMPER SYSTEM

[72] Inventors: Stanley L. Zetterlund, Easton, Pa.; Robert O. Skogen, Faribault, Minn.

[73] Assignee: Nutting Truck and Caster Company, Faribault, Minn.

[22] Filed: Sept. 28, 1970

[21] Appl. No.: 76,054

[52] U.S. Cl. ...................................................104/172 BT
[51] Int. Cl. .....................................................B65g 17/42
[58] Field of Search ..................104/172 BT, 178; 293/30

[56] References Cited

UNITED STATES PATENTS

| | | | |
|---|---|---|---|
| 3,467,023 | 9/1969 | Doods et al. | 104/172 BT |
| 3,589,301 | 6/1971 | Regan | 104/172 BT |

*Primary Examiner*—Arthur L. La Point
*Assistant Examiner*—Robert Saifer
*Attorney*—Frederick E. Lange, William C. Babcock and Eugene L. Johnson

[57] ABSTRACT

A truck for tow line use is provided with an improved movable bumper construction. A preferred form of such movable bumper construction includes a longitudinally extending shaft on such bumper, means supporting the shaft for longitudinal movement between first and second positions, means normally urging the shaft and bumper toward one of said positions, and latching means for selectively locking the movable bumper in each of its first and second positions. The specific latching means includes at least one angularly movable locking washer through which a bumper shaft projects, the washer being angularly movable between a position in which the shaft is freely movable in either direction, and at least one position inclined to the axis of the shaft for locking engagement to prevent movement of the shaft in one direction.

11 Claims, 6 Drawing Figures

INVENTORS
STANLEY L. ZETTERLUND
BY ROBERT O. SKOGEN
William C. Babcock
ATTORNEY

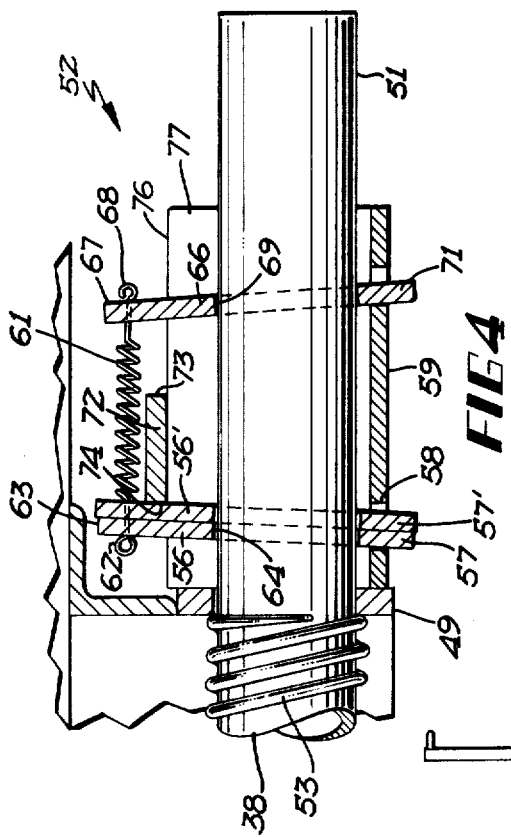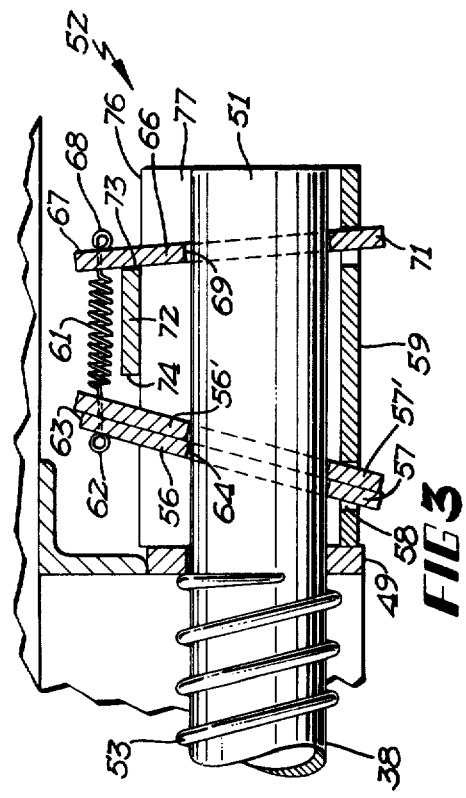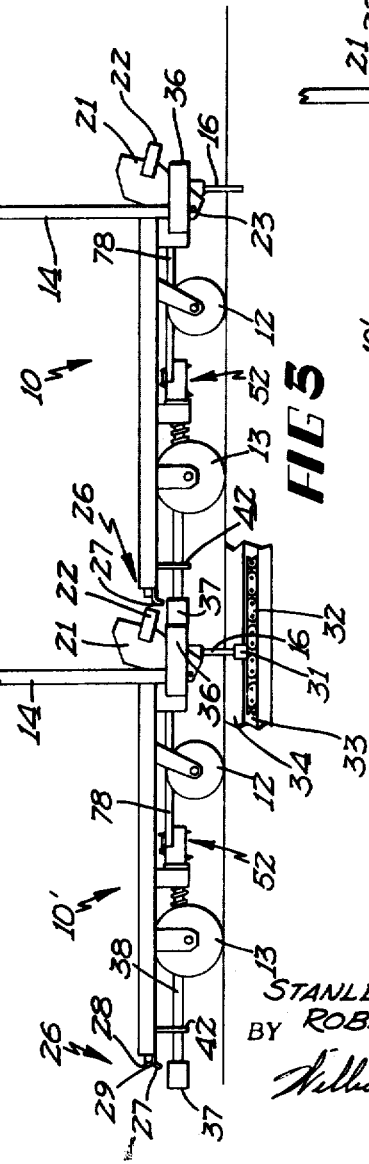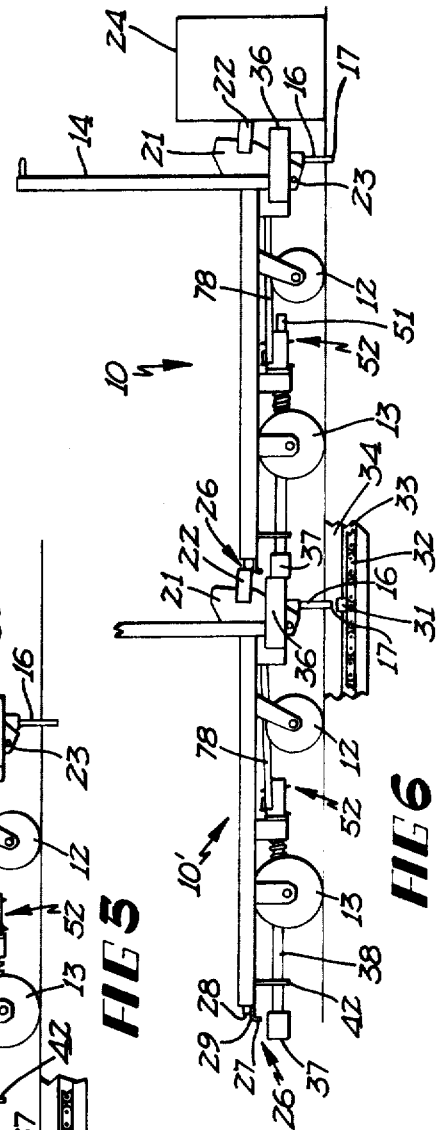

TOW LINE TRUCK AND BUMPER SYSTEM

A preferred complete bumper system for such a tow line truck includes both fixed and movable front bumpers and fixed and movable rear bumpers. The movable rear bumper is movable longitudinally between a rearwardly projecting position (in which it can serve as a pushing bumper, while it can be normally engaged and pushed by the fixed front bumper of a following truck), and a retracted position (in which such movable rear bumper does not serve as a pushing bumper, since it is not effectively engaged for such pushing by the fixed front bumper of the following truck). In this retracted position of the movable rear bumper, the fixed rear bumper portion of a leading truck will then be engaged by the movable front bumper of a following truck. The resulting rearward movement of the movable front bumper of the following truck will disengage its tow pin from the normal tow line conveyor to stop the truck. Each truck includes latching means for selectively locking the movable rear bumper in each of its rearwardly projecting and retracted positions. A latch operating means includes a connection between the movable front bumper and the latching means for locking the rear bumper in rearwardly projecting position when the movable front bumper is in its forward position and for locking the rearwardly projecting bumper in its retracted position when the movable front bumper is moved to its rearward position.

BACKGROUND OF THE INVENTION

Tow line conveyor trucks are known in which a movable front bumper is designed to engage an obstacle or another truck ahead of the truck in question for movement of such front bumper to a position in which it effectively disengages the truck from driving connection with the usual tow line conveyor. Such trucks are also known in which a movable rear bumper may be locked in one position for pushing engagement by a following truck in such a manner that the movable front bumper of the following truck is not operated to disengage the driving connection of the following truck with its conveyor. Some of these prior constructions involve swinging or pivoted rear bumpers which may involve only a limited range of movement or which may be susceptible to damage by engagement of a heavy following truck at substantial speed. Such prior bumper constructions also appear to be positively latched or locked in only one position and may therefore tend to return prematurely to that position after being moved in one way or another to their alternate position.

SUMMARY OF THE INVENTION

The present invention accordingly provides a relatively rugged movable bumper construction for a tow conveyor truck, in which such movable bumper is supported for movement between first and second positions and may be selectively locked in each of said positions by suitable latching means. The bumper itself preferably includes a shaft extending longitudinally of the truck and supported for sliding movement of the shaft and bumper between longitudinally spaced positions. The latching means preferably includes at least one angularly movable locking washer on said shaft, which is operatively positioned by a latch operating means or control member to selectively permit free movement of the shaft in one direction or to prevent such movement in that direction. Alternately, such latching means may also be operated to prevent movement of the shaft and bumper in the opposite direction. Specifically, two such locking washers are supported in such a manner that the latch operating means controls the tilting of one washer to one position to lock the shaft against movement in one direction, while alternatively and selectively the latch operating means controls tilting of the other washer in the other direction to lock the shaft and bumper against movement in the opposite direction. The bumper is preferably resiliently urged toward one of its two positions when the latching means permits such movement.

Such a movable bumper and latching arrangement is embodied in an improved combination of bumpers for a tow line conveyor truck in such a manner that the truck can normally be pushed by a similar following truck, for example, when the truck is to be pushed off the main conveyor line onto a shunt or sideline which does not have its own tow line conveyor. If, however, another truck or other obstacle is engaged by such a truck under circumstances where it is desirable or necessary to stop the movement of the leading truck, as well as any following trucks which might be approaching it or pushing it, then the relative arrangement of front and rear bumpers of the truck, the latching means, and suitable interconnection with the tow pin or other driving member which engages the tow line conveyor, all cooperate and interact with each other so as to stop the following trucks and prevent damage to any of the equipment whenever the leading truck encounters an obstacle or is intentionally stopped.

BRIEF DESCRIPTION OF THE DRAWINGS

In the drawings which form a part of this application, and in which like reference characters indicate like parts:

FIG. 3 is an enlarged partial side view of an improved bumper latching mechanism according to the invention, with the parts in position to lock the bumper against movement in one direction;

FIG. 4 is a view similar to FIG. 3, but with the parts in position to lock the bumper against movement in the opposite direction;

FIG. 5 is a side view, with certain details omitted, showing schematically the manner in which the bumper construction of the present invention facilitates the pushing of a truck when there is no obstacle in its path; and FIG. 6 is a view similar to FIG. 5 showing the manner in which the bumper system of the present invention disengages the driving connections of the various trucks when a leading truck encounters an obstacle.

DESCRIPTION OF THE PREFERRED EMBODIMENT

Figure 1:
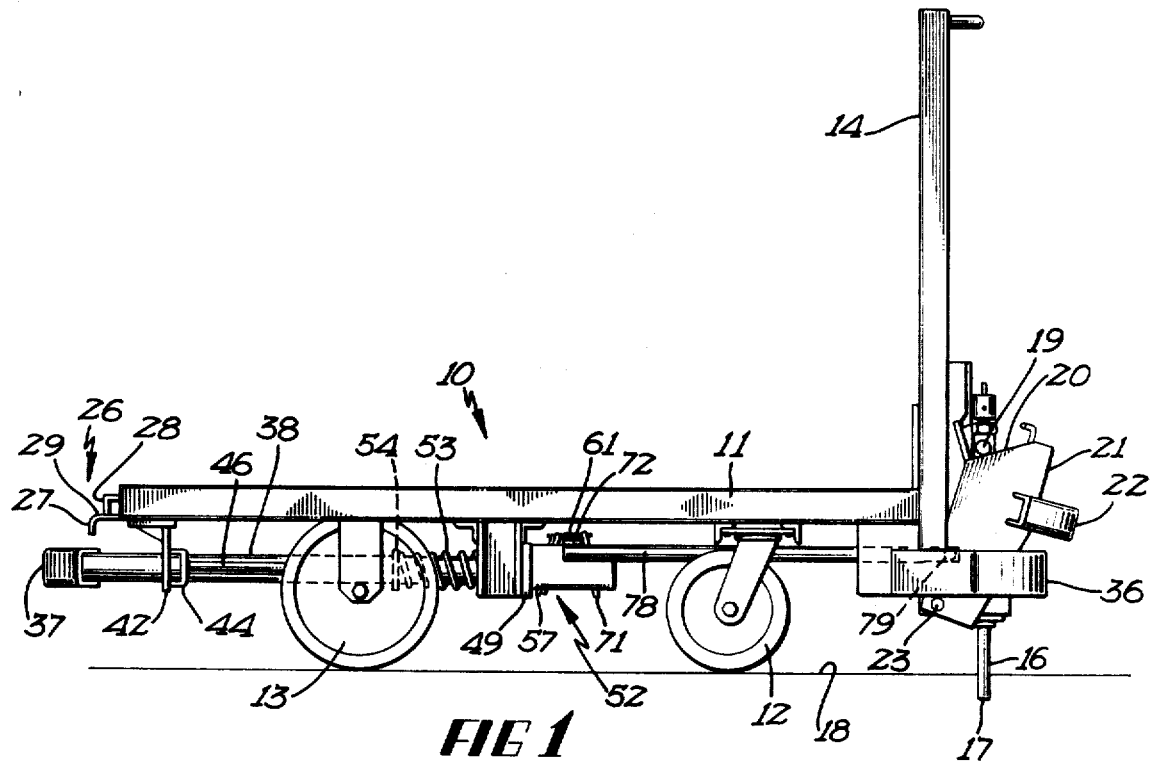
FIG. 1 is a side elevation of a tow line conveyor truck embodying features of this invention.
Figure 2:
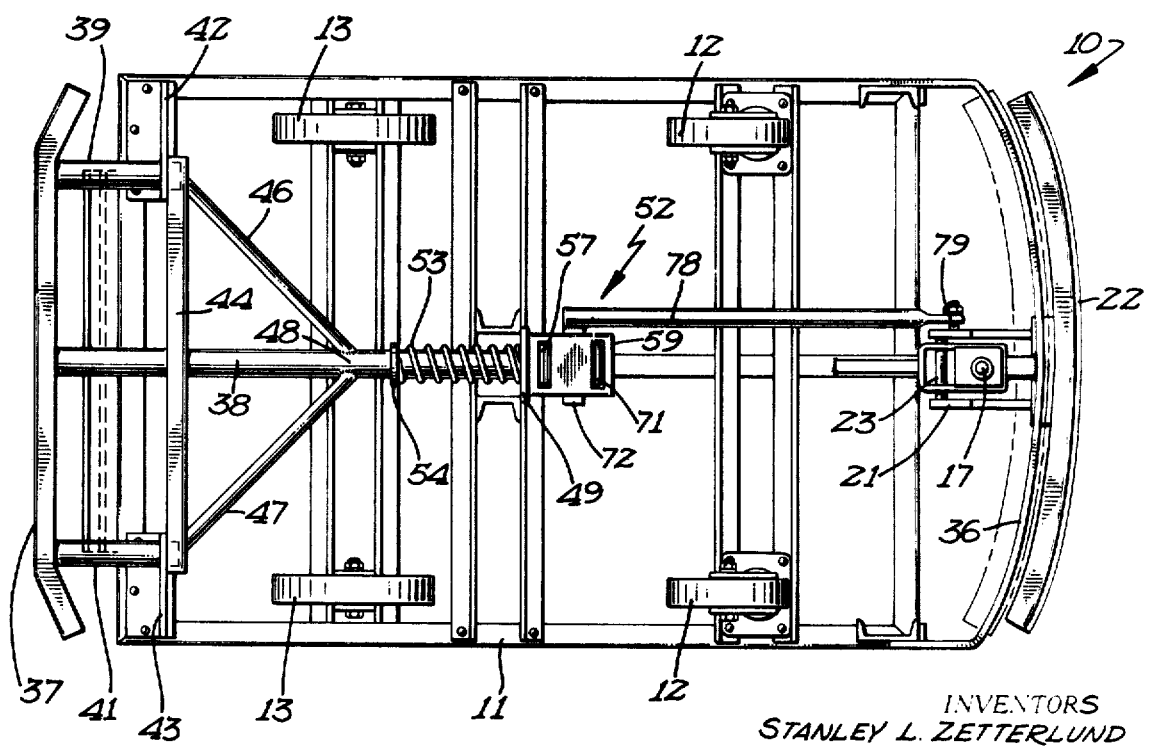
FIG. 2 is a bottom view of the truck of FIG. 1.

As shown in FIGS. 1 and 2, a preferred form of a tow truck according to the present invention is indicated generally at 10 and includes a flat bed 11 carried by front and rear supporting wheels or casters 12 and 13. Front casters 12 are generally pivoted on a vertical axis to permit steering or guiding of the truck along a desired path. An upwardly projecting front frame portion 14 at the forward end of the truck provides a front wall against which cargo may be conveniently stacked on the bed 11 of the truck and also serve as a convenient portion of the truck to serves grasped for manual guidance of the truck. Truck 10 is provided with the usual means for engaging a tow line conveyor of one sort or another. In this case the truck is illustrated with a front tow pin 16 adapted to project downwardly below the floor level 18 so that the lower end 17 of the tow pin can be engaged by a driving portion of any suitable floor conveyor to move the truck along a desired path determined by the direction of the floor conveyor and its slot.

Tow pin 16 is supported for relative vertical movement at the front of the truck 10 and carries a cross pin 19 which may be engaged by an inclined cam surface 20 on a bumper supporting bracket 21 pivoted to the frame at 23. A movable front bumper member 22 is secured to bracket 21. When this bumper 22 and supporting bracket 21 are swung to the rear with respect to pivot 23 by engagement of the bumper with an obstacle in front of the truck, such as a box left on the conveyor path, cam surface 20 engages cross shaft 19 and lifts tow pin 16 out of engagement with the driving portion of the floor conveyor. This operation is further illustrated in FIG. 6 where the movable front bumper 22 of a truck 10 has encountered a box 24 in the path of the truck and been moved rearwardly to lift tow pin 16. Similarly, if another similar truck 10' is following the leading truck 10, its movable front bumper 22 will engage a rear bumper portion of the leading truck and be swung rearwardly to lift the tow pin 16 of the following truck.

Although the rear end of truck bed 11 could serve as a fixed rear bumper, a preferred arrangement of a fixed rear bumper portion for such a truck is shown in FIG. 1. Here a fixed rear bumper indicated generally at 26 includes a lower rearwardly projecting portion 27, an upper fixed portion 28 which does not project so far to the rear as portion 27, and a horizontal ledge 29 between these two portions. In certain cases, as shown in FIG. 6, the front movable bumper 22 of the following truck 10' will first engage the portion 27 of the rear bumper 26 of the leading truck 10. As the bumper 22 then rocks rearwardly and upwardly on its pivot 23, the lower front edge of bumper 22 can rest on the horizontal ledge 29 of the rear bumper of the leading truck. Thus the weight of bumper 22 will not rock it back downwardly and forwardly to permit re-engagement of the tow pin 16 with its driving conveyor, until the leading truck 10 has been moved out of the way. In other words, the tendency of bumper 22 to return forwardly and downwardly to its normal projecting position under its own weight might, in the absence of ledge 29, tend to separate the trucks sufficiently to permit re-engagement of the tow pin of the following truck, before the obstacle 24 was removed from the front of the leading truck.

As shown in FIG. 6, the lower end 17 of the tow pin of truck 10' has been raised sufficiently to prevent its engagement with the driving member 31 on a conveyor tow chain 32 which is longitudinally movable and supported in side recesses 33 of a normal floor slot 34. In the position of FIG. 6, however, the tow pin 16 is moved upwardly just far enough to prevent the driving engagement, but not far enough to remove the lower end 17 of the pin from the floor slot 34. Thus the truck will remain in alignment with the conveyor so that it can again be moved along the desired conveyor line, when the tow pin 16 is restored to its lower driving position. The tow pin 16 of the leading truck 10 has been similarly raised by engagement of leading bumper 22 with obstacle 24, and this operation will be the same whether truck 10 is moving along a main driving conveyor line or whether it is in the process of being pushed onto a shunt line where its tow pin guide slot has no driving conveyor at all.

According to the present invention, the tow truck just described is further provided with a specially designed movable pushing bumper member 37, which is illustrated in this embodiment as projecting at the rear of the truck, beyond the fixed rear bumper 26. When locked in the position of FIG. 1, this movable rear pushing bumper 37 is adapted for engagement by a fixed front pushing bumper 36 of a similar following truck, as illustrated in FIG. 5. The relative positions of the fixed and movable front bumpers and the fixed and movable rear bumpers of the truck are accordingly arranged, so that when the parts are in the positions of FIGS. 1 and 5, the fixed front bumper of a following truck 10' engages the locked movable rear bumper 37 of a leading truck 10, before the movable front bumper 22 of the following truck can reach the fixed rear bumper 26 of the leading truck. Thus the tow pin of the following truck 10' will remain in its engagement with the driving conveyor, and truck 10' can push the leading truck 10. Such pushing engagement is desirable when the leading truck is being diverted from the main conveyor to a shunt in which the tow pin of the leading truck 10 follows a guide slot branching away from the main driving slot, but such branch slot has no conveyor or driving member of its own.

The preferred form of movable bumper construction 37 is accordingly designed to withstand substantial pushing forces without damage to other parts of the truck mechanism. As shown particularly in FIG. 2, the bumper 37 is secured at the rear of a longitudinally extending shaft 38, which is slidable supported in one or more flanges 49 extending transversely of the truck bed. The bumper is further supported by parallel side shafts 39 and 41, which slide longitudinally in supporting brackets 42 and 43 at the rear of the truck. A cross member 44 and diagonal braces 46 and 47 welded to shaft 38 at 48 connect the forward ends of shafts 39 and 41 to this bumper assembly and provide a total bumper assembly of extremely rigid construction. This bumper can move longitudinally of the truck between the rearwardly projecting position shown in FIGS. 1 and 2 and a retracted position as illustrated by the leading truck 10 in FIG. 6, where the rear bumper 37 of the leading truck 10 has been moved to its retracted position by engagement of the rigid front bumper 36 of a following truck 10'. This retraction of the pushing bumper 37 of truck 10 permits engagement of the movable front bumper 22 of the following truck 10' against the fixed rear bumper portion 26 of the leading truck to disengage the tow pin 16 of the following truck when an obstacle has been encountered by the leading truck at 24. In summary, when the movable rear bumper 37 is locked in the positions of FIGS. 1 and 2, the operation of the system will be as shown in FIG. 5, in which the fixed front pushing bumper of the following truck will engage the locked rearwardly projecting movable pushing bumper of the leading truck and continue to push the leading truck as long as no obstacle is encountered. When the movable rear bumper 37 is no longer locked in its projecting position, the fixed front bumper 36 of a following truck will push the rear bumper 37 of the leading truck forwardly as shown in FIG. 6 to an extent which permits engagement of the movable front bumper 22 of the following truck against the fixed rear bumper of the leading truck to disengage the tow pin of the following truck 10' as described.

The present invention further contemplates the provision of novel latching means for selectively locking the movable bumper 37 in either its rearwardly projecting or its retracted position. This latching means is indicated generally at 52 and includes a latch housing within which the forward end 51 of bumper shaft 38 projects as shown in FIGS. 1 through 4. The construction also includes means normally urging the movable bumper toward one of its positions. In this case, a resilient spring member 53 is engaged between fixed flange 49 on the truck and a flange 54 on shaft 38 under sufficient compression to normally and resiliently urge bumper 37 toward its rearwardly projecting first or normal pushing position.

The preferred form of locking mechanism for holding the bumper in its rearwardly projecting first or pushing position is illustrated in locking position in FIG. 3. An angularly movable locking washer 56 has a downwardly extending projection 57 at one side of shaft 38 which is received in a retaining slot 58 in the bottom plate 59 of the latch housing. A spring 61 at the opposite side of shaft 38 has one end 62 engaging the upper end 63 of lock washer 56 to resiliently and normally urge the upper end of the washer toward the right in FIG. 3 and thus rotate the washer angularly in a clockwise direction with respect to the effective pivot provided by the edges of slot 58 in the bottom plate 59. A central opening 64 in lock washer 56 has a diameter slightly greater than the outside diameter of portion 51 of shaft 38. Thus if washer 56 were substantially perpendicular to the shaft (as illustrated in FIG. 4), the member 56 would have no locking effect on shaft 38, and both the shaft and its bumper would be freely movable in either direction as far as washer 56 is concerned, depending on the forces applied. When lock washer 56 is resiliently urged in a clockwise direction as shown in FIG. 3, however, the edges of opening 64 engage and bind the shaft 38, if any effort is made to move that shaft toward the right. Thus lock washer 56, in the position of FIG. 3, locks the bumper 37 and shaft 38 in the projecting position of FIGS. 1, 2 and 5. For additional locking effect, a second similar lock washer 57' may be mounted as shown in FIG. 3 immediately adjacent to locking washer 56.

Although the locking washer 56 might conceivably be arranged so that it could be swung in either direction to selectively lock shaft 38 against movement either to the right or to the left, an additional locking washer or member is preferably provided to lock the shaft 38 and bumper 37 in the retracted position of FIGS. 4 and 6 under certain desired circumstances. Specifically, once the parts have operated as shown in FIG. 6 to disengage the tow pin 16 of a following truck 10', the latching means of the present invention locks the movable rear bumper 37 of the leading truck 10 in its retracted position, so that the resilience of spring member 53 will not push the bumper to the rear and thus push the rearward truck 10' far enough to the rear to disengage bumpers 22 and 26 and permit premature re-engagement of tow pin 16 of truck 10'.

Thus, as shown in FIGS. 3 and 4, an additional locking washer 66 is positioned around shaft 38 at a location spaced somewhat forwardly of the lock washer 56. The upper end 67 of washer 66 is normally urged to the left by the remaining end 68 of spring 61. Thus spring 61 connects the upper ends of the two lock washers and tends to rotate them in opposite directions so that these upper ends are drawn toward each other. The opening 69 in lock washer 66 has a diameter similar to that of the opening 64 in washer 56, slightly greater than the diameter of portion 51 of shaft 38. Thus in the position of FIG. 3, lock washer 66 has no binding effect on shaft portion 51 in either direction. Its lower end carries a projection 71 extending into a slot in the bottom wall 59 similar to slot 58.

If the upper end 67 of the second locking member 66 is permitted to swing to the left under the resilience of spring 61, as shown in the position of FIG. 4, then the locking member 66 will engage the shaft portion 51 and resist movement of that portion to the left in FIG. 4, although movement of shaft 51 to the right would be permitted as long as the washer was free to swing angularly to the right against the resilience of spring 61.

The latch mechanism includes latch operating means in the form of a laterally extending control member 72 which selectively determines which of the latching members 56 and 66 respectively shall be effective to lock the shaft portion 51 against movement in one direction or the other. This cross member 72 has a leading edge 73 and a rearward edge 74. In the position shown in FIG. 3, control member 72 is in a relatively forward position, so that its edge 73 holds the upper portion 67 of latch member 66 sufficiently far to the right to prevent any locking action one way or the other by member 66. In this position, however, the resilience of spring 61 draws the upper end 63 of latch member 56 toward the right far enough to provide binding engagement with shaft portion 51 and thus prevent or resist movement of that shaft portion toward the right in FIG. 3. Movement of the shaft portion 51 to the left would be permitted, however, when the parts are in the position of FIG. 3, since the latch member 56 would be free to rotate angularly in a counter-clockwise direction against the resilience of spring 61 far enough to prevent any binding action by the edges of opening 64 against shaft portion 51.

Conversely, as the control member 72 is moved toward the rear of the truck as shown in FIG. 4, the rear edge 74 will engage the upper portion of latch members 56, 56' and tilt those latch members angularly to a substantially vertical position, where they will exert no binding effect on shaft 51. At the same time, edge 73 of control member 72 will move rearwardly away from the upper portion of the second locking member 66 and will permit that locking member to swing angularly in a counter-clockwise direction under the influence of spring 61 to the binding position shown in FIG. 4. In that position, the member 66 will lock shaft portion 51, so as to prevent or resist movement of the shaft and bumper to the left, i.e., to the rear of the truck. At the same time, however, when the parts are in this position, shaft portion 51 can move to the right resistance locking resistance from member 66, i.e., when bumper 37 is engaged by a following truck under the conditions shown in FIG. 6. Such movement of shaft portion 51 to the right tilts the member 66 in a clockwise direction against the resilience of spring 61 just far enough to prevent binding engagement of the edges of opening 69. During such movement, spring 53 is further compressed to provide some cushioning or shock absorbing effect as the following truck 10' is brought to a stop. Spring 53 must not, however, be stiff enough to prevent retraction of bumper 37 and the resulting engagement of movable accumulating bumper 22 of truck 10' with bumper 36 of truck 10 to disengage the driving connection of the tow pin of truck 10', when it encounters truck 10 as shown in FIG. 6. Washer 66 will then hold shaft 51 and bumper 37 in retracted position, until obstacle 24 is removed.

According to the present invention, the position of control member 72 is accordingly determined in relation to the relative position of the movable front bumper 22 and/or the tow pin 16. Specifically, as shown in FIGS. 1 and 2, the latch operating means 72 is carried at the rear end of a longitudinally extending control rod 78, which has its forward end pivotally connected at 79 to the movable bracket 21 of the front bumper 22. Thus when the movable front bumper is in its normal forwardly projecting position as shown in FIGS. 1 and 5, the latch control member 72 will be in the forward position shown in FIG. 3. Conversely, when the movable front bumper 22 is swung to its retracted position (shown in dotted lines in FIG. 2, and also shown in FIG. 6), the latch control member 72 will be moved to its rearward position as illustrated in FIG. 4. In that position, bumper 37 will be held in its projecting position only by the resilience of spring 53. This position is shown for truck 10' in FIG. 6. When the bumper 37 is engaged by a following truck, however, it will no longer function as a pushing bumper, but will be moved against the resilience of spring 53 to the retracted position shown for leading truck 10 in FIG. 6.

The construction and operation of a preferred form of construction of movable bumper 37 and latching means 52 according to the invention have been set forth in the foregoing description. A relatively rugged form of construction has been provided, which permits bumper 37 to be resiliently moved to a projecting or pushing position and to remain locked in that position to provide a desired pushing function, whenever there is no obstacle in the path of the truck. The construction automatically unlocks the rear pushing bumper, however, when the truck encounters an obstacle. Then the pushing bumper will be moved to retracted or non-pushing position by engagement of a following truck, and will be locked in retracted position, until the obstacle is removed. When the pushing bumper is thus retracted, the movable front bumper of the following truck will be operated to disengage the tow pin of that truck until the obstacle is removed. At that point, the latching mechanism will be automatically operated to permit resilient movement of the pushing bumper back to projecting position, thereby separating the trucks sufficiently to re-establish the desired driving engagement of one or both trucks with the tow line conveyor and to re-establish the desired pushing function as the pushing bumper is again locked in pushing position.

The bumper and latching mechanism are relatively simple in construction, but are also sufficiently rugged and resilient to withstand the forces involved in this type of operation. The arrangement of such a bumper with means for normally urging it to its projecting position and for locking it selectively in each of its projecting and retracted positions, depending upon the relative position and condition of a movable front accumulating bumper and retractable tow pin on such a truck, all combine to provide the desired operation of such a tow line conveyor system in an improved and economical manner.

What is claimed is:

1. In a tow line conveyor truck having a tow pin movable between a driving position and a non-driving position, a movable front accumulating bumper, means supporting the movable front bumper on the truck for movement from a normal forwardly projecting position to a retracted position in response to engagement of the bumper with an object in front of said truck and for return movement from retracted position to forwardly projecting position when the object is moved away from the front of the truck, means operatively interconnecting said movable front bumper and tow pin for movement of the tow pin to non-driving position when the movable front bumper moves to retracted position and for movement of the tow pin to driving position when the movable front bumper moves back to normal projecting position, the improvement comprising a second movable bumper, means supporting the second movable bumper on the truck for movement between first and second positions, means normally urging the bumper from its second position toward its first position, and latching means on the truck operatively connected to the second movable bumper for selectively locking that bumper in each of its first and second positions, said latching means being movable between a first locking position, in which it prevents movement of the second movable bumper from its first to second position, and a second locking position, in which it prevents movement of the second movable bumper from its second to its first position.

2. An improved tow line truck according to claim 1 in which the second movable bumper is positioned at the rear of the truck, the truck also having substantially a fixed front pushing bumper, a fixed rear accumulating bumper portion mounted at the rear of the truck at a position in which the fixed rear bumper is located for engagement by the movable front bumper of a similar following truck, the second movable bumper being supported on the truck for movement between a rearwardly projecting first position, in which that bumper is located for engagement by the fixed front bumper of a similar following truck and thereby prevents engagement of said fixed rear bumper portion by the movable front bumper of such a following truck, and a retracted second position, in which the relative location of the second movable bumper permits engagement of said fixed rear bumper portion by the movable front bumper of such a following truck.

3. An improved tow line truck according to claim 1 in which the latching means includes latch operating means operatively connected to said movable front bumper and thereby moving the latching means out of its first locking position in response to movement of the movable front bumper to its retracted position and also moving the latching means out of its second locking position in response to movement of the movable front bumper to its projecting position.

4. An improved tow line truck according to claim 1 in which said second movable bumper includes a shaft extending longitudinally of the truck parallel to the desired path of movement of the truck, and in which said latching means includes first and second longitudinally spaced locking washers each having an opening through which said shaft projects, means engaging each of said washers at one side of the shaft for preventing longitudinal movement of that side of each washer and permitting rocking movement of each washer, and latch operating means at the opposite side of said shaft for engaging each washer, said latch operating means being movable along said shaft between a first position, in which the latch operating means holds one locking washer out of locking engagement with the shaft, while the second washer is inclined to the shaft and locks it against movement in one direction, and a second position in which the latch operating means holds the other locking washer out of locking engagement with said shaft, while said one locking washer is inclined thereto and locks said shaft against movement in the opposite direction.

5. An improved tow line truck according to claim 4 having resilient means extending longitudinally between and connected to the first and second locking washers and thereby resiliently urging rocking movement of the washers in respectively opposite directions.

6. In a tow line conveyor truck having means for driving engagement with a tow line conveyor for movement of the truck along a desired conveyor path, the improvement comprising a movable bumper, means on the truck supporting the bumper for movement between first and second positions, means normally urging said bumper from its second toward its first position, and latching means on the truck operatively connected to the bumper for selectively locking the bumper in each of its respective first and second positions, said latching means being movable between a first locking position, in which it prevents movement of the bumper from its first position toward its second position, and a second locking position, in which it prevents movement of the bumper from its second toward its first position.

7. In a tow line conveyor truck having means for driving engagement with a tow line conveyor for movement of the truck along a desired conveyor path, the improvement comprising a movable bumper, means on the truck supporting the bumper for movement between first and second positions, means normally urging said bumper from its second toward its first position, and latching means on the truck operatively connected to the bumper for selectively locking the bumper in each of its respective first and second positions, said latching means being movable between a first locking position, in which it prevents movement of the bumper from its first position toward its second position, and a second locking position, in which it prevents movement of the bumper from its second toward its first position), said movable bumper including a longitudinally extending shaft supported for sliding movement parallel to said conveyor path, and said latching means including an angularly movable locking washer having an opening through which said shaft projects, means engaging said locking washer for preventing longitudinal movement of the washer, and latch operating means controlling the angular position of the washer to lock said shaft.

8. A tow line truck according to claim 7 in which said latching means includes first and second longitudinally spaced locking washers each having an opening through which said shaft projects, means engaging each of said locking washers at one side of the shaft for preventing longitudinal movement of that side of each washer and permitting rocking movement of each washer, and latch operating means adjacent said shaft for engaging each washer, said latch operating means being moveable along said shaft between a first position, in which the latch operating means holds one locking washer out of locking engagement with the shaft, while the second washer is inclined to the shaft and locks it against movement in one direction, and a second position (in which the latch operating means holds the other locking washer out of locking engagement with said shaft, while said one locking washer is inclined thereto and locks said shaft against movement in the opposite direction).

9. A tow line truck according to claim 8 having resilient means extending longitudinally between and connected to the first and second locking washers and thereby resiliently urging rocking movement of the washers in respectively opposite directions.

10. A tow line truck according to claim 7 in which said means normally urging said bumper from its second toward its first position comprises a resilient spring member supported on the longitudinally extending shaft.

11. In a tow line conveyor truck having a tow pin movable between a driving position and a non-driving position, a movable front accumulating bumper portion, means supporting the movable front bumper on the truck for movement from a normal forwardly projecting position to a retracted position in response to engagement of the bumper with an object in front of said truck and for return movement from retracted position to forwardly projecting position when the object is moved away from the front of the truck, means operatively interconnecting said movable front bumper and tow pin for movement of the tow pin to non-driving position when the movable front bumper moves to retracted position and for movement of the tow pin to driving position when the movable front bumper moves back to normal projecting position, and a fixed rear accumulating bumper portion at the rear of the truck at a position in which such fixed rear bumper portion is located for engagement by the movable front accumulating bumper of a similar following truck, the improvement comprising front and rear pushing bumper portions located on the truck for pushing engagement of the rear pushing bumper portion of a leading truck by the front pushing bumper portion of a similar following truck, means supporting one of said pushing bumper portions on the truck for movement longitudinally along the desired truck path between a projecting first position, in which the pushing bumper portion is located for inter-engagement with the other pushing bumper portion of a similar truck and thereby prevents inter-engagement of the accumulating bumper portions of such similar trucks, and a retracted second position (in which the relative position of the movable pushing bumper portion permits interengagement of the accumulating bumper portions of such similar trucks, means normally urging the movable pushing bumper portion from its second position toward its first position, latching means on the truck operatively connected to the movable pushing bumper portion and to the movable front accumulating bumper portion for selectively locking the movable pushing bumper portion in its first position when the front accumulating bumper is in its normally projecting position, for permitting movement of the movable pushing bumper portion from its first to its second position and locking it in its second position whenever the front accumulating bumper is moved from its projecting to its retracted position, and for thereafter permitting movement of the movable pushing bumper portion from its second to its first position whenever the front accumulating bumper has returned to its normally projecting position.

* * * * *